C. E. DAVIDSON & B. I. MAULDIN.
NUT LOCK.
APPLICATION FILED MAR. 10, 1909.

949,624.

Patented Feb. 15, 1910.

WITNESSES
F. C. Barry
Percy B. Turpin

INVENTORS
CHARLES E. DAVIDSON
BLAKE I. MAULDIN
BY Munn & Co.
ATTORNEYS

UNITED STATES PATENT OFFICE.

CHARLES E. DAVIDSON AND BLAKE I. MAULDIN, OF OZONA, TEXAS.

NUT-LOCK.

949,624.  Specification of Letters Patent.  Patented Feb. 15, 1910.

Application filed March 10, 1909. Serial No. 482,467.

*To all whom it may concern:*

Be it known that we, CHARLES E. DAVIDSON and BLAKE I. MAULDIN, citizens of the United States, and residents of Ozona, in the county of Crockett and State of Texas, have made certain new and useful Improvements in Nut-Locks, of which the following is a specification.

This invention is an improvement in nut locks and has for an object to provide a construction affording a pawl like device carried in the body of the nut and adapted to bed itself in the bolt threads or seat in grooves or channels formed therein; and the invention consists in certain novel constructions and combinations of parts as will be hereinafter described and claimed.

Figure 1:
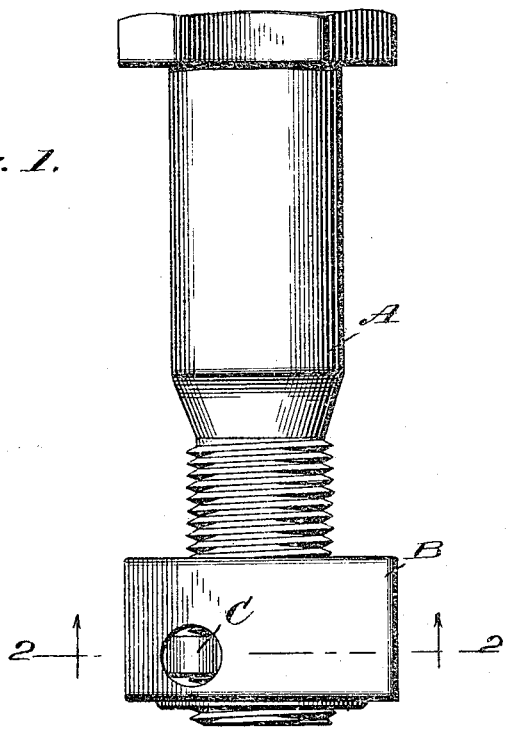
Figure 2:
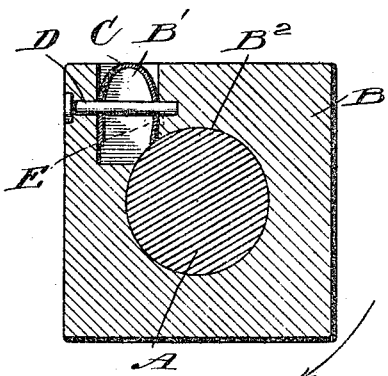
Figure 3:
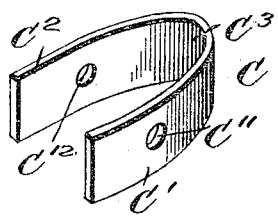

In the drawing Figure 1 is a side view of a nut lock embodying our invention. Fig. 2 is a cross section on about line 2—2 of Fig. 1. Fig. 3 is a detail view of the double armed pawl, and Fig. 4 is an end view of the nut applied to the bolt, and also showing the latter channeled longitudinally for engagement by the pawl.

Figure 4:
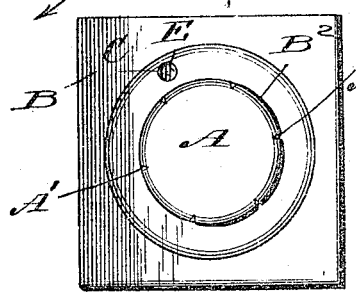

The bolt A may be of ordinary construction as shown in Fig. 1, or it may have one or more grooves or channels A' crossing its threads as shown in Fig. 4.

The nut B may in general construction be such as ordinarily made but is provided with a recess B' in one of its faces which extends to and opens into the bolt opening B² of the nut. This recess B' receives the pawl C, which is shown as a double armed pawl with its arms C' and C², which, may be alike formed, by bending the pawl at C³ into bowed form, and the arms C² and C' are provided with holes C¹² and C¹¹ through which a securing pin or rivet D is passed as shown in Fig. 2, to secure the pawl in place. When the arms C' and C² are alike the pawl, when one arm is worn at its extremity, can be reversed bringing a fresh surface into position to bite upon the threads of the bolt. The channel E leads from the outer end of the nut into the recess B', and permits the introduction of a nail, wire, knife blade or other suitable implement for raising the point of the pawl out of engagement with the bolt when it is desired to release the lock. When in the position shown in Fig. 2, it will be noticed the nut may be turned freely in the direction indicated by the arrow, but will be locked against turning in the reverse direction by the engagement of its pawl with the bolt A, either by bedding itself in the threads or by engaging in the channels when the construction shown in Fig. 4 is employed.

The channel E opens into the recess B' near one wall of the latter and operates as a releasing hole for the introduction of any desired implement, and the pin D secures the pawl in such manner as to permit the utilization of the entire spring of the pawl. The holes for the pin D intersect the recess B' at a right angle.

It will be noticed that the recess B' is circular in cross section, see Fig. 1, also that the releasing hole or channel is circular as are also the holes for the pin or rivet D, so these holes and recesses may be made by ordinary drills thus cheapening the production of the device for use as before described.

Manifestly, the devices may be made in different sizes to suit nuts and bolts of different size.

We claim—

1. The combination of a bolt, a nut threaded thereon, and having in one side a recess circular in cross section and extending to the bolt hole of the nut, and also having pin holes intersecting said recess at a right angle, and a releasing hole or channel leading from the outer end of the nut into the said recess near one wall of the latter, and a double armed pawl bowed at its middle and having its arms provided with coincident holes, and the extremity of one of its arms operating in the bolt hole of the nut and engaging with a pawl like action upon the bolt, and a pawl securing pin or rivet passing through both arms of the pawl and securing the latter to the nut, substantially as set forth.

2. A nut having a bolt hole, and a recess communicating at its inner end therewith, and a double armed pawl in said recess and having the extremity of one of its arms operating in the bolt hole, said arms of the pawl having coincident openings, and a pin or rivet extending through said holes and securing the pawl in place, substantially as set forth.

3. A nut having a bolt hole and having in one side a recess circular in cross section and extending to the bolt hole of the nut and communicating at one side with the said bolt hole and a double armed pawl bowed at its middle and fitting in said circular recess and having one arm projecting at its extremity into the bolt hole of the nut and having its other arm spaced away from said bolt hole and bearing against the opposite wall of the circular recess substantially as set forth.

4. A nut having a bolt hole and provided in one side with a recess circular in cross section and extending to the bolt hole of the nut and communicating at one side therewith, a double armed pawl in said recess and having its arms extending longitudinally within the circular recess and in the same direction, one of said arms projecting at its inner end into the bolt hole of the nut and the other arm lying opposite said first arm and bearing against the opposite wall of the recess and a retaining pin passed through both said arms of the pawl, substantially as set forth.

CHARLES E. DAVIDSON.
BLAKE I. MAULDIN.

Witnesses:
Tom Nolen,
Arthur Hamblen.